T. ARBEITER.
GUARD.
APPLICATION FILED JUNE 26, 1912.
1,132,147.
Patented Mar. 16, 1915.
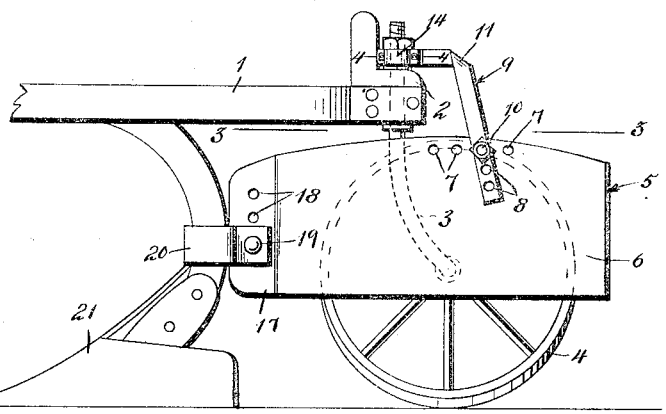
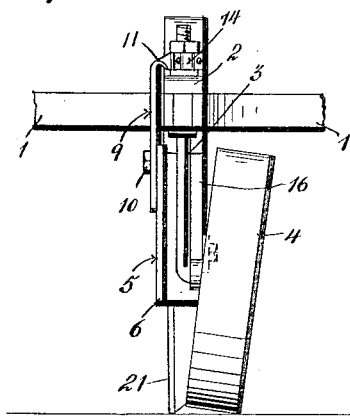
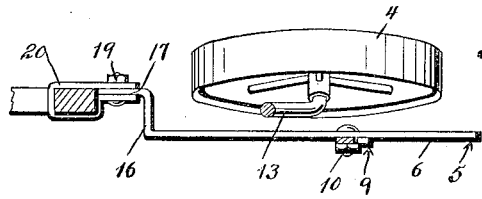
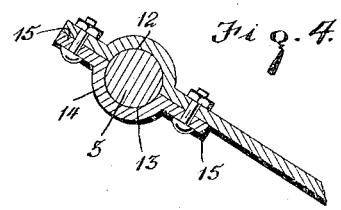
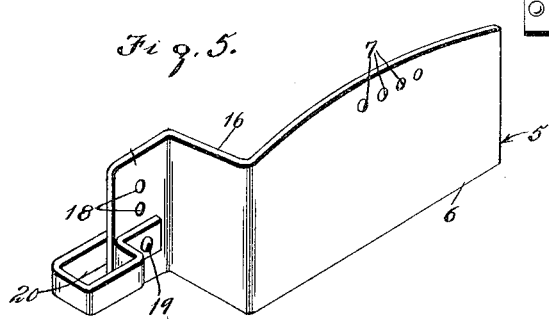
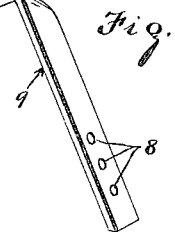
Inventor
T. Arbeiter
Witnesses
By
Attorneys

UNITED STATES PATENT OFFICE.

TRAUGATT ARBEITER, OF DOLTON, SOUTH DAKOTA, ASSIGNOR TO JOHN S. EWERT, OF DOLTON, SOUTH DAKOTA.

GUARD.

1,132,147.  Specification of Letters Patent.  Patented Mar. 16, 1915.

Application filed June 26, 1912. Serial No. 706,097.

*To all whom it may concern:*

Be it known that I, TRAUGATT ARBEITER, a citizen of the United States, residing at Dolton, in the county of Turner, State of South Dakota, have invented certain new and useful Improvements in Guards; and I do hereby declare the following to be a full, clear, and exact description of the invention, such as will enable others skilled in the art to which it appertains to make and use the same.

The present invention is directed to improvements in guards for wheels of sulky or gang plows.

The invention has for its object to provide a device of this character which can be easily and quickly applied to the rear wheel of a sulky or gang plow to protect the same from dirt, weeds or the like, which frequently gather thereon and retard the operation of the wheel.

A further object of the invention is to so construct a device of this character that the same may be conveniently and quickly applied to a gang or sulky plow of any well known type.

With these and other objects in view, this invention resides in the novel features of construction, formations, combinations and arrangements of parts to be hereinafter more fully described, claimed and illustrated in the accompanying drawing, in which:—

Figure 1 is a side elevation of the rear portion of the plow showing the device in place thereon. Fig. 2 is a rear elevation of the same. Fig. 3 is a sectional view on line 3—3 of Fig. 1. Fig. 4 is a similar view on line 4—4 of Fig. 1. Fig. 5 is a detail perspective view of the guard. Fig. 6 is a similar view of the supporting member.

Referring to the drawing, the numeral 1 designates the rear ends of the beams, which meet and are provided with a bearing 2 in which is journaled a shaft 3, to the lower end of which is attached a wheel 4 which serves to support the rear end of the plow.

The guard 5 consists of a vertically disposed plate 6 having a plurality of alined perforations 7 formed near its upper edge, any one of which is adapted to register with any one of the vertically alined perforations 8 formed in the lower end of the supporting member 9, said perforations when in registry are adapted to be engaged by a bolt 10. The supporting member 9 is partially twisted intermediate its ends, as at 11, thus positioning the supporting member in proper relation to the guard 5 and shaft 3.

The upper end of the supporting member is formed with a depression 12 which is adapted to confront a depression 13 formed in the clamp 14, the flanges 15 of which are perforated for receiving securing devices which pass through the upper end of the supporting member to attach the same to the upper end of the shaft 3, thus supporting the guard 5.

The guard 5 terminates at its inner end in an angularly disposed plate 16, which in turn terminates in a plate 17, the latter plate being arranged in parallel alinement with the plate 6 forming the guard.

The forward edge of the plate 17 is provided with a plurality of vertically alined perforations 18, which are adjustably engaged by a bolt 19 which passes through the outer ends of a clip 20, said clip being adapted to embrace the standard of the rear plow share 21, thus supporting the guard 5 adjacent the wheel 4 so that the same will be protected against dirt and weeds.

From this construction it will be seen that a guard has been produced which may be conveniently attached to any well known gang or sulky plow, and that the same may be adjusted to suit all conditions.

What is claimed is:—

A wheel guard consisting of a plate adapted to be supported adjacent the wheel, perforations formed in the upper edge of the plate, a supporting member having its lower end provided with a plurality of perforations adapted to register with any one of the perforations formed in the plate, the upper end of said supporting member being provided with a clamping member, said plate terminating in a right angle plate at its forward end which terminates in a plate arranged at right angles thereto and in parallel alinement with the first named plate, said plate being provided with a plurality of vertically alined perforations, a clip adjustably connected to the perforated plate.

In testimony whereof, I affix my signature, in presence of two witnesses.

TRAUGATT ARBEITER.

Witnesses:
F. A. SCHMIDT,
F. C. ZUROFF.

Copies of this patent may be obtained for five cents each, by addressing the "Commissioner of Patents, Washington, D. C."